Oct. 28, 1969  A. W. OEHLER ET AL  3,474,606
TILTABLE PLATFORM FOR HARVESTER

Filed May 18, 1967

INVENTORS
A. W. OEHLER
G. W. ROHWEDER

Oct. 28, 1969　　A. W. OEHLER ET AL　　3,474,606
TILTABLE PLATFORM FOR HARVESTER

Filed May 18, 1967　　2 Sheets-Sheet 2

INVENTORS
A. W. OEHLER
G. W. ROHWEDER

United States Patent Office

3,474,606
Patented Oct. 28, 1969

3,474,606
TILTABLE PLATFORM FOR HARVESTER
Alvin William Oehler and Glen Willard Rohweder,
Moline, Ill., assignors to Deere & Company, Moline,
Ill., a corporation of Delaware
Filed May 18, 1967, Ser. No. 639,524
Int. Cl. A01d 67/00, 41/02
U.S. Cl. 56—208                                     7 Claims

ABSTRACT OF THE DISCLOSURE

A conventional self-propelled grain combine includes a adjustable feeder house and a transversely elongated grain harvesting platform mounted on the forward end of the feeder house for tilting about a transverse axis to vary the pitch of the platform bottom relative to the ground.

BACKGROUND OF THE INVENTION

This invention relates to an agricultural harvesting machine such as a combine or the like and more particularly to an improved means for mounting the harvesting platform thereon.

A conventional self-propelled grain combine includes a main separator body mounted on a pair of forward drive wheels for advance over a field, a vertically swingable feeder house mounted on and extending forwardly from the body, and a forward transversely elongated harvesting platform rigidly secured to the forward end of the feeder house. The platform conventionally includes a relatively flat bottom supporting a transverse mower bar on its leading edge, the mower bar severing the crop from the field as the machine advances, after which the crop is converged and delivered rearwardly through a rearward platform outlet and through the feeder house to the combine body. When harvesting relatively low-growing crops such as soybeans or the like, it is desirable to sever the crop as close to the ground as possible to reduce the portion of the crop left in the field. Accordingly, in such crops the combine is generally operated with the bottom of the platform riding along the ground, the feeder house and the platform mounted thereon rising and falling about the feeder house pivot to follow the contour of the ground.

A typical combine can be equipped with a variety of different tire sizes on its forward wheels to adapt the combine for different crops and soil conditions. Of course, the height of the combine and consequently the distance between the feeder house pivot and the ground varies according to the size of the tires. Since the angle of the feeder house relative to the ground depends on the height of the pivot when the platform is resting on the ground, the feeder house attitude and the pitch of the platform secured thereto vary according to the tire size. Thus, while the platform bottom may be set in the optimum position for cutting the crop close to the ground with one tire size, a change in tire size will shift the platform from its optimum cutting angle. For example, when the tire size is decreased, the feeder house will swing upwardly about its pivot, raising the front edge of the platform bottom and the cutter bar mounted thereon relative to the rearward portion of the platform bottom, which rides on the ground.

SUMMARY OF THE INVENTION

According to the present invention, means have been provided for selectively adjusting the pitch or tilt of the platform about a transverse axis relative to the combine feeder house, so that the platform bottom may be maintained in its optimum position with the cutting mechanism close to the ground, regardless of the size of the combine tires or the angle of the feeder house relative to the ground. More specifically, the invention features the mounting of the platform on a transverse pivot carried by the feeder house and a locking means for maintaining the platform in a selected angular position on said pivot.

Another feature of the invention resides in providing said platform tilt pivot coaxial with a rotatable element in the drive mechanism, which drives the platform harvesting mechanisms, such as the cutter bar, reel, and auger, so that the platform drive is not affected by a change in position of the platform relative to the feeder house.

Still another object of the invention is to provide a simple and inexpensive mechanism to accomplish the above result.

DESCRIPTION OF THE PREFERRED
EMBODIMENT

The harvesting machine chosen for purposes of illustrating the invention is a self-propelled combine having a main separator body or frame 10 supported at its rear end by a steerable wheeled axle structure 12 and at its forward end by a transverse front axle structure 14 supported at its opposite ends on right and left front traction wheels 16 and 18 respectively. It is to be understood that the terms "right" and "left" are with reference to a person facing in the direction of forward machine travel, and that such terms, as well as terms such as "forwardly," "rearwardly," "upwardly," "downwardly," etc., are terms of convenience used to more clearly describe the invention, and are not to be construed as limitations.

Figure 2:
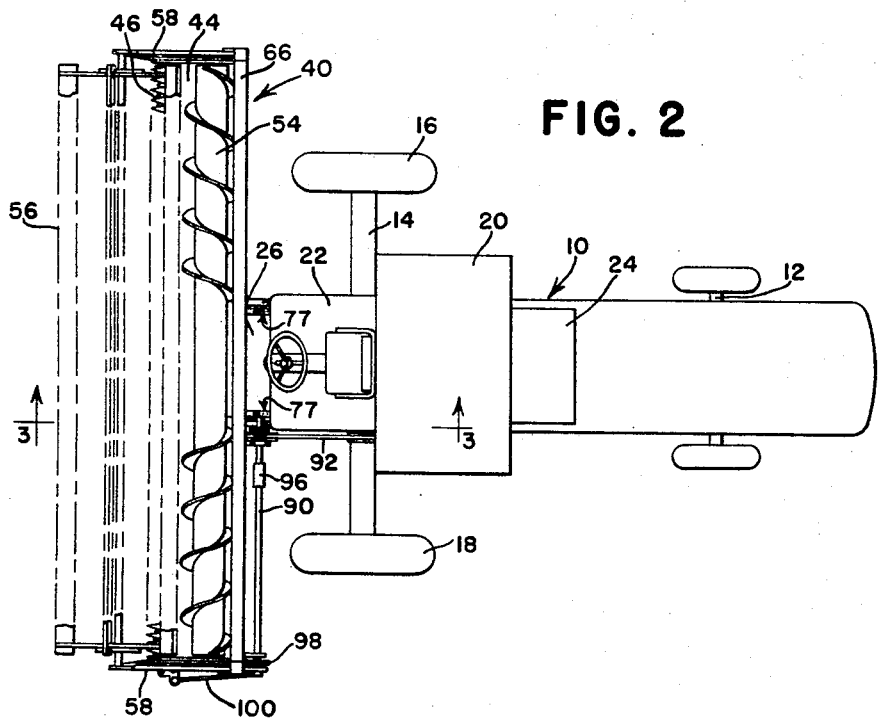
FIG. 2 is a plan view of the entire combine on a reduced scale.

Mounted on the combine body are a grain tank 20, an operator's station 22 forwardly of the grain tank, and a power source 24 rearwardly of the grain tank, much of the detail of said components as well as of the remainder of the combine body being of conventional construction and omitted from FIG. 2 for the purposes of clarity.

Mounted on and extending forwardly from the combine body is a crop-feeding housing or feeder house 26, which conventionally includes angularly connected fore-and-aft extending walls forming a generally upright transverse opening 28 at the forward end of the feeder house, and a rearward opening (not shown) communicating with the interior of the combine body. The feeder house 26 is vertically adjustable about its rearward end on a transverse pivot or shaft 30 at the rearward end of the feeder house, the pivot 30 being removably journaled in and supported by a pair of forwardly extending brackets 32 mounted on the combine body 10 on opposite sides of the feeder house. The position of the feeder house is established by a pair of hydraulic cylinders 34, only one of which is shown in the drawings, having their rearward ends attached to the axle structure 14 via pivots 36 and their forward ends attached to the bottom of the feeder house via pivots 38, the pressurization or exhaust of the cylinders 34 being conventionally controlled by the operator from the operator's station 22 via any suitable control valve means.

A forwardly disposed transversely elongated grain harvesting platform or header 40 is supported at the front end of the feeder house 26 and includes a transverse generally upright rear wall 42, a generally horizontal bottom 44 supporting a transverse mower bar or cutting mechanism 46 along its leading edge, and generally upright fore-and-aft extending right and left side panels 48 and 50 respectively, the rear wall 42, bottom 44, and mower bar 46 extending between the side panels 48 and 50. The lower end of the rear wall 42 is curved forwardly converging with the bottom 44 and forming a transverse trough 52, which cooperates with a transverse auger 54 having oppositely wound flights at opposite ends for converging the crop to the middle of the platform. A transverse reel 56 is mounted on the platform forwardly of the auger 54 and above the mower bar 46, the reel being mounted on and journaled by a pair of fore-and-aft extending arms 58 pivotally connected to the rear wall at their rearward ends, the vertical position of the arms 58 and the reel 56 carried thereby being established by a pair of hydraulic cylinders 60, the extension of which is controlled by the operator through suitable valve means.

The rear wall 42 is provided with a central crop transfer opening 62 which registers with the front opening 28 in the feeder house. The opening 62 is encompassed by rearwardly extending projections 64 which lie adjacent to the forward ends of the feeder house walls in a telescoping relationship. The platform 40 is reinforced by transverse beams 66 along the top edge of the rear wall and a plurality of generally C-shaped members 68, the upright portions of which are attached to the rear wall and the forwardly extending portions of which are attached to the bottom 44 and provide skid means for the platform when it is moving along the ground.

Figure 3:
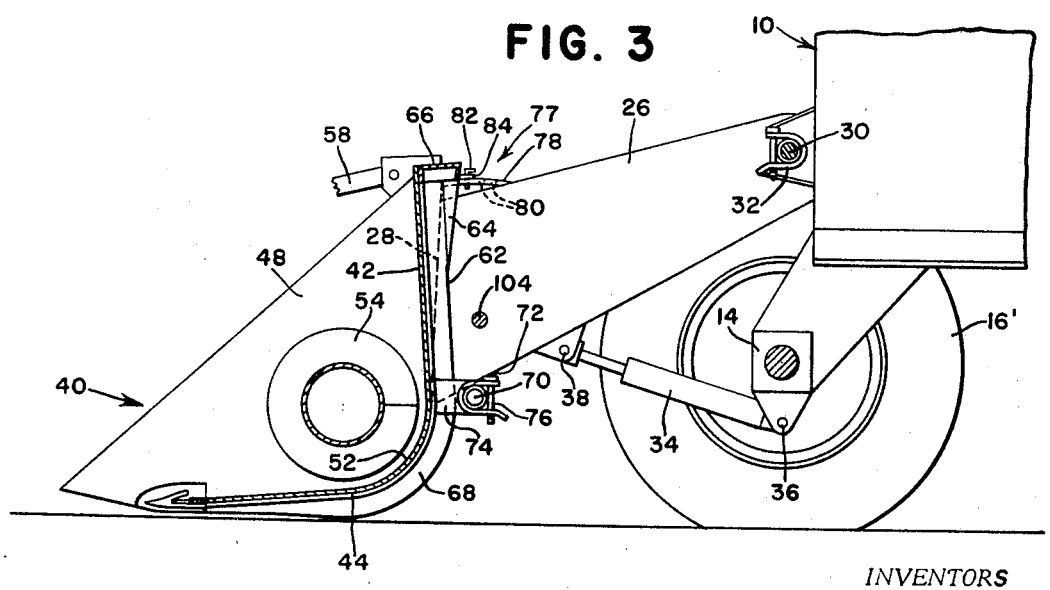
FIG. 3 is a vertical fore-and-aft section of the front portion of the combine as seen along the line 3—3 of FIG. 2, but showing the combine on the same enlarged scale as FIG. 1 and illustrating the combine with a smaller size front tire and with the harvesting platform in a different alternate position relative to the feeder house.

The platform or header 40 is removably and adjustably mounted on the forward end of the feeder house 26 with its crop transfer opening 62 accommodating the forward end of the feeder house and registering with the feeder house opening 28. As best shown in FIG. 3, the platform is pivotally connected to the lower forward portion of the feeder house 26 by means of a pair of transverse coaxial pivots 70 respectively supported at opposite sides of the feeder house in a pair of brackets 72, which depend from the lower forward portion of the feeder house. Only the left side mounting is shown in FIG. 3, the mounting on the right side of the feeder house being identical to the illustrated mounting. The platform is swingably mounted on the pivots 70 via a pair of brackets 74 which project rearwardly from the rear wall 42 and journal the pivots 70, the brackets 74 being removably retained on the pivots by locking pins 76. As is apparent from the drawings, the above-described mounting is similar to the mounting at the rear end of the feeder house afforded by the pivot 30 in the bracket 32, which mountings being old and well-known in the art.

The tilt position of the platform about the pivot axis 70 is selectively established by a locking means, indicated in its entirety by the numeral 77 and operative between the upper rear edge of the platform and the upper forward edge of the feeder house, the locking means also permitting complete separation of the header and platform. The locking means 77 includes a pair of arcuate straps 78, affixed to the forward end of the top of the feeder house 26 respectively adjacent to the opposite sides of the feeder house and coaxial with the pivots 70, the straps 78 being provided with a plurality of vertical apertures 80 in fore-and-aft alignment. The platform is locked to the straps by a pair of locking pins 82, respectively insertable through vertically apertured brackets 84 extending rearwardly from the platform top beam 66 and overlying the straps 78 and into the altrenate apertures 80.

Figure 1:
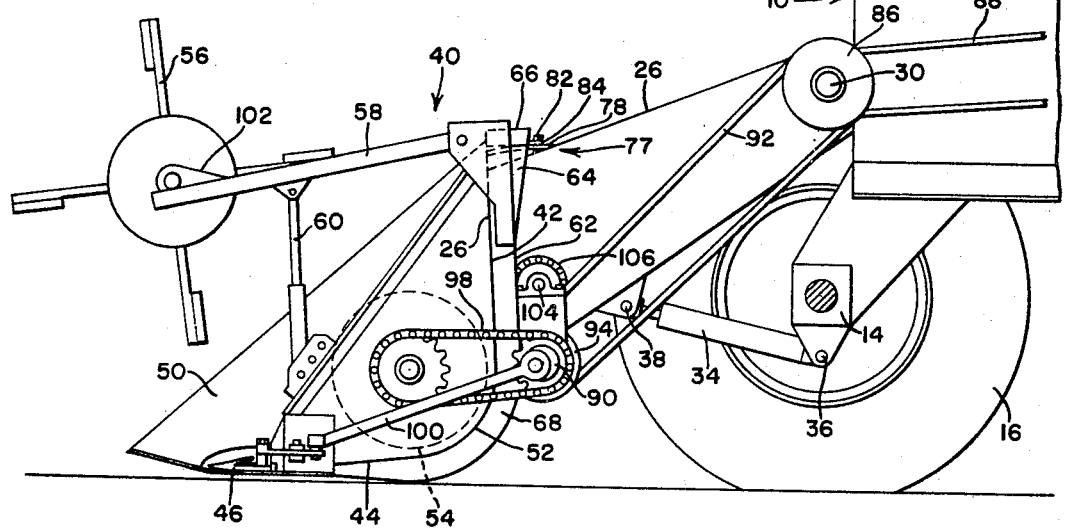
FIG. 1 is a side elevation view of the front portion of a typical combine having a grain harvesting platform mounted thereon in one alternate position relative to the feeder house.

The conventional drivable elements on the platform and in the feeder house are connected to and driven by the engine 24 by a conventional drive train, which includes a pulley 86 coaxially attached to the shaft-like pivot 30, the shaft 30 being connected to and driven by the engine by a drive, which includes an endless driving element 88. The pulley 86 is drivingly connected to a transverse platform drive shaft 90 via an endless driving element 92 trained around the pulley 86 and a pulley 94 attached to the shaft 90, the shaft 90 being journaled on the platform at its outer end and coaxially connected to the left side pivot 70 at its other end, which carries the pulley 94. The shaft 90 is provided with an axially shiftable coupling 96 which permits separation of the drive shaft 90 into two parts respectively mounted on the feeder house and the platform, when the platform is separated from the feeder house. The outer end of the shaft 90 is drivingly connected to the auger 54 by conventional chain drive 98, to the mower bar 46 by a conventional pitman drive 100, and to the reel 56 by belt drive 102, only a portion of which is shown in FIG. 1. The inner end of the drive shaft 90 is drivingly connected to a feeder cylinder at the forward end of the feeder housce 26, only the shaft 104 of which is shown, the driving connection being established by a chain drive 106. The feeder house also conventionally includes a raddle-type conveyor along its bottom rearwardly of the beater, the conveyor being driven by the combined shaft and pivot 30.

In operation, when the operator desires to cut the crop close to the ground, the cylinder 34 is exhausted, permitting the downward swing of the feeder house 26 on the pivot axis 30 until the platform 40 rests on the ground. It is desirable that the contact with the ground be made by the skids formed by the members 68, and if the forward end of the platform and the mower bar 46 are engaging the ground, rather than the mmebers 68, the locking means 77 is released by removing the pins 82, so that the platform is free to rock relative to the feeder house about the pivots 70. Further retraction of the cylinder 34 will cause the pivots 70 to move downwardly, whereby the platform will rock in a clockwise direction (FIGS. 1 and 3) about its pivot, and after the members 68 engage the ground, additional retraction of the cylinders 34 will cause the mower bar 46 to raise from the ground. When the mower bar is positioned for the desired clearance above the ground, the platform is locked by reinserting the pins 82 through the brackets 84 and into the corresponding apertures 80 in the straps 78.

When the combine is provided with larger size tires 16 and 18, as shown in FIG. 1, the feeder house pivot 30 is located a relatively large distance above the ground, so that when the platform rests on the ground, the feeder house is maintained at a relatively steep angle relative to the ground, so that it is necessary to lock the upper end of the platform in a rearward position to maintain the mower bar 46 a proper distance from the ground, as shown in FIG. 1. However, when a smaller size tire, as indicated by the numeral 16' in FIG. 3, is utilized, the pivot 30 is spaced a shorter distance above the ground, so that the angle between the feeder house and the ground is smaller when the platform is maintained on the ground. If the platform 40 were locked in its rearward position, as shown in FIG. 1, the mower bar 46 would be spaced an undesirably large distance above the ground. To obtain the proper ground clearance, the locking mechanism 77 is simply unlocked, permitting the forward end of the platform to swing downwardly about the pivots 70 and when the desired position of the platform is attained, the locking pins 82 are inserted through the appropriate apertures 80 in the straps 78, the forward apertures 80 being utilized for smaller tire sizes as shown in FIG. 3. The overlapping projection 64 in conjunction with the beams 66 and the members 68 telescope relative to the feeder house exterior during the swinging of the platform relative to the feeder house and close the gap between the platform and feeder house when the upper end of the platform is forward relative to the feeder house.

Obviously, the alternate positions of the platform relative to the feeder house permit adjustment of the platform tilt when the platform is maintained above the ground, although the angle of the platform bottom in such a case is not of such critical importance as during the operation of the platform on the ground. The tilt adjustment of the platform does not affect the relationship of the drive components in the platform drive mechanism since the platform drive shaft 90 is coaxial with the pivots 70 so that its relative position to both the feeder house and platform is constant regardless of the position of the platform.

Another advantage of the illustrated construction is that it permits complete separation of the platform from the front of the feeder house, whereas, in conventional machines, the feeder house is permanently attached to the platform. This avoids the provision of a feeder house on each different harvesting platform used by the combine, reducing the cost of the different platforms.

Figure 4:
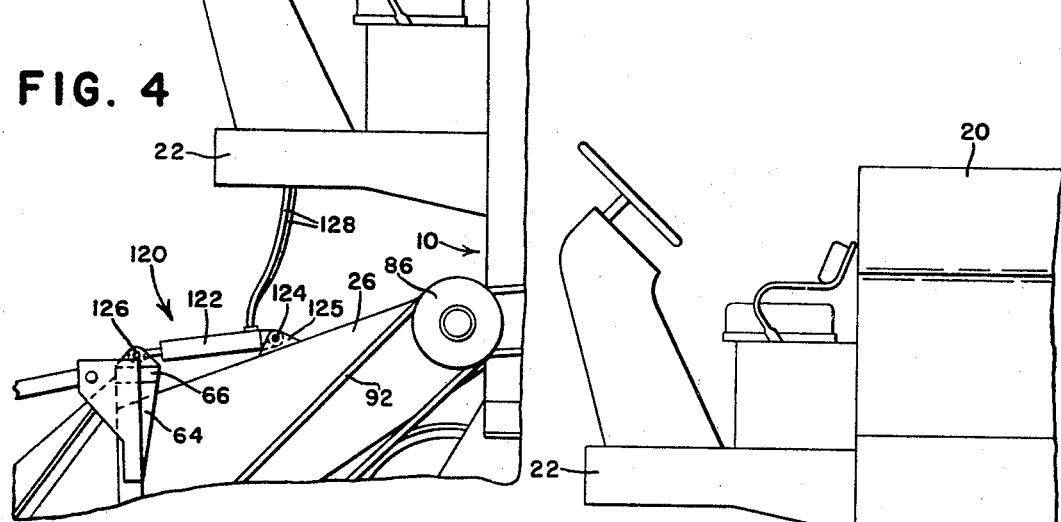
FIG. 4 is a side elevation of the upper front portion of the combine similar to FIG. 1 but showing a different means for adjusting the tilt position of the platform.

A slightly different embodiment of the invention is shown in FIG. 4, wherein the platform 40 is again removably and adjustably mounted on the forward end of the feeder house 26 on the transverse pivots 70 (not shown in FIG. 4). However the tilt position of the platform about the pivot axis 70 is selectively established by a different type of locking means, indicated in its entirety by the numeral 120 in FIG. 4. The locking means 120 includes a two-way hydraulic cylinder 122 having its rearward end pivotally mounted on a transverse pivot 124, carried by a bracket 125 mounted on the top of the feeder house 26, and its forward end swingably mounted on a transverse pivot 126 mounted on top of the platform beam 66. The extension or retraction of the cylinder 122 is accomplished through the hydraulic lines 128, which are selectively pressurized or exhausted in the conventional manner by a control valve (not shown) manually actuated by a control lever 130 at the operator's station. Thus, the tilt position of the platform can be selectively varied by the operator from the operator's station, permitting a change in the angle of the platform to provide maximum harvesting efficiency while the machine is operating.

Other features and advantages of the present invention will readily occur to those skilled in the art, as will many modifications and alterations in the preferred embodiment of the invention described herein, all of which may be achieved without departing from the spirit and scope of the invention.

What is claimed is:

1. In a mobile harvesting machine having a fore-and-aft body adapted to advance over the ground and including a forwardly disposed, vertically adjustable crop feeding housing having a forward crop inlet opening, and a harvesting platform disposed forwardly of said housing and having a generally upright rear wall provided with a rearward crop transfer opening registrable with the crop inlet opening and a generally horizontal bottom having a transverse harvesting device along its leading edge, the improvement residing in improved means for mounting the platform on the front of said housing and comprising: a transverse pivot means carried by the housing proximate to its forward end, the platform being rockably mounted on said pivot means; and locking means operative between the platform and the housing for selectively locking the platform in any one of a plurality of alternate positions about its pivot axis relative to the housing.

2. The invention defined in claim 1 wherein said platform is rockable in a relatively small arc between said alternate positions to vary the angular relationship of the platform bottom relative to the ground for any given position of the pivot means relative to the ground.

3. The invention defined in claim 2 and including a drive means drivingly connected to the harvesting device and including a transverse drive shaft coaxial with said pivot means.

4. The invention defined in claim 3 wherein said pivot means is attached to the housing proximate to the lower edge of said crop inlet opening and the locking means is attached to the housing proximate to the upper edge of the crop inlet opening.

5. The invention defined in claim 4 wherein the platform crop transfer opening and housing crop inlet opening register in a telescoping relationship, the forward end of the feeder housing telescoping relative to the platform opening as the platform rocks between its alternate positions.

6. The invention defined in claim 5 wherein the locking means includes at least one arcuate strap affixed to the top of the housing, the center of the curvature of said strap being generally coaxial with the pivot means, said strap being provided with a plurality of alternate fore-and-aft spaced apertures, said locking means also including a bracket attached to the platform and a pin means carried by the bracket and insertable into the alternate apertures in said strap to establish the alternate platform positions.

7. The invention defined in claim 1 wherein the harvesting machine includes an operator's station and the locking means includes power means operative between the platform and the housing and actuatable to change the position of the platform about its pivot axis and manually actuatable control means at the operator's station for actuating the power means.

References Cited

UNITED STATES PATENTS

| | | | |
|---|---|---|---|
| 2,170,573 | 8/1939 | Pierson | 56—208 |
| 2,514,764 | 7/1950 | Herigstad | 56—208 |
| 2,840,973 | 7/1958 | Thomson et al. | 56—208 XR |
| 3,363,407 | 1/1968 | Drummond | 56—23 |
| 3,402,540 | 9/1968 | Karlsson et al. | 56—208 |

ANTONIO F. GUIDA, Primary Examiner

U.S. Cl. X.R.

56—23